No. 730,353. PATENTED JUNE 9, 1903.
G. O. DRAPER.
AUTOMOBILE.
APPLICATION FILED DEC. 26, 1902.
NO MODEL.
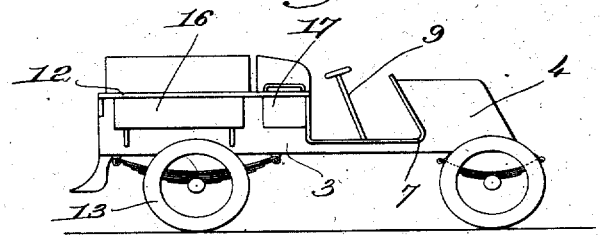
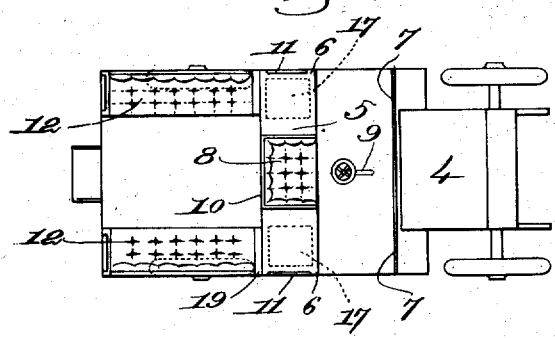
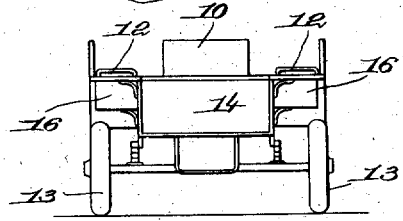
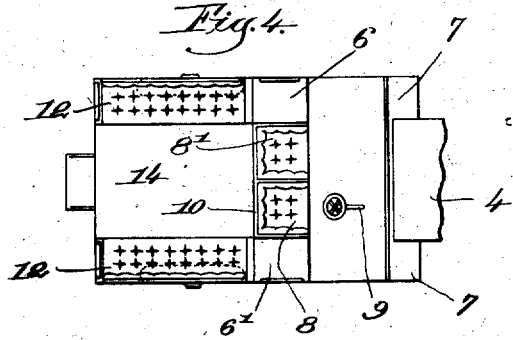
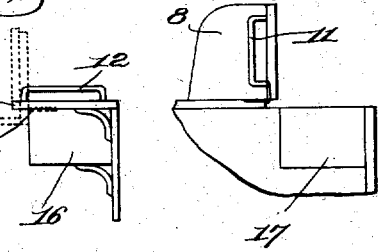
Witnesses:
Thomas J. Drummond
S. Wm. Lutton
Inventor.
George O. Draper,
By Crosby Gregory
Attys No. 730,353. Patented June 9, 1903.

UNITED STATES PATENT OFFICE.

GEORGE OTIS DRAPER, OF HOPEDALE, MASSACHUSETTS.

AUTOMOBILE.

SPECIFICATION forming part of Letters Patent No. 730,353, dated June 9, 1903.

Application filed December 26, 1902. Serial No. 136,526. (No model.)

*To all whom it may concern:*

Be it known that I, GEORGE OTIS DRAPER, a citizen of the United States, and a resident of Hopedale, county of Worcester, State of Massachusetts, have invented an Improvement in Automobiles, of which the following description, in connection with the accompanying drawings, is a specification, like numerals on the drawings representing like parts.

In the style of automobile which is now commonly used for touring purposes the number of passengers which can be carried is limited to four or five. The motors which are used in these automobiles, however, are capable of developing sufficient horse-power to carry several additional passengers, provided the body of the vehicle is constructed to accommodate such extra passengers.

It is the object of my present invention to provide a novel form of automobile-body which has a greatly-increased carrying capacity over the automobiles as now constructed, but which does not increase the size of the automobile as a whole.

In my Patent No. 693,591, dated February 18, 1902, is illustrated an automobile-body which has a transverse seat facing the front and a rear compartment having seats on three sides thereof. The front seat is made of a width sufficient to comfortably accommodate three passengers by extending it beyond the body of the vehicle on both sides of the latter. The foot-rest portions for the seat are also extended beyond the main portion of the vehicle-body on each side thereof and across the plane of the front wheels, so that it performs the double function of a foot-rest and mud-guard. The rear compartment is also made wide enough to extend over or across the plane of the rear wheels, so that the under side of the projecting portions of said compartments takes the place of mud-guards for the rear wheels.

I have embodied in my present invention the main features of the above-mentioned patented device, but have materally modified the construction shown in said patent, so as to include new features and so as to obtain many new advantages.

In my present invention I provide the body of the vehicle with a transversely-extending front seat, which is of such a width as to project beyond the main portion of the body at each side thereof and to extend across the plane of the wheels, the foot-rest portion of said seat being of substantially the width of the seat and serving the double function of foot-rest and mud-guard, all as described in said patent. In my present invention, however, only that portion of the front seat which is opposite the steering mechanism and which is to be occupied by the operator or chauffeur has a back, the end portions of the seat being without any backs. This construction permits the passengers occupying the end portions of said seats to face either front or back, as desired, and has the further advantage that when the vehicle is being occupied by a single person there is a minimum amount of obstruction to catch the wind. The portion of the body to the rear of the front seat is provided with two longitudinally-extending seats arranged to face each other, said seats extending over the rear wheels.

It is the object of this invention to utilize all the possible carrying space either for passengers or tools, luggage, or equipment of any character, and therefore, in addition to the features above pointed out, I have placed beneath the portions of the seats which project beyond the main portion of the body compartments or boxes in which luggage of any character may be stowed. Preferably the seat-boards of the seats will be hinged in order to provide means of gaining access to the compartments.

In an automobile constructed as above described all available space is utilized for carrying either passengers or tools, luggage, &c.

Figure 1 of the drawings is a side view of the automobile embodying my improvements. Fig. 2 is a plan view of Fig. 1. Fig. 3 is an end view of my improved automobile. Fig. 4 shows a modification, and Figs. 5 and 6 are details hereinafter described.

My improvements can be applied to any character of automobile, regardless of the character of the motive power.

The main portion 3 of the body is mounted upon any suitable running-gear in any usual way and carries any suitable motor. The motor may be positioned in any part of the body 3; but in the style of automobile illustrated in Fig. 1 it will preferably be placed at the front end 4 thereof and covered by suitable casing. I have not deemed it necessary to illustrate any particular motor, as it forms no part of my present invention.

Extending transversely across the body 3 is the seat 5, which extends at its ends 6 beyond the body 3 and across the plane of the wheels, as in my above-mentioned patent.

7 designates the foot-rest portion, which also extends beyond the body 3 and across the plane of the wheels and performs the double function of foot-rest and mud-guard.

That portion 8 of the seat 5 which is opposite the steering device 9 is provided with a suitable back 10 and faces the front, this portion of the seat constituting the seat to be occupied by the person operating the vehicle. The end portions 6 of the said seat, however, are not provided with backs, although, if desired, they may have side guards 11.

At the rear of the seat 5 and extending longitudinally are two seats 12, which face each other and which are situated over the rear wheels 13, the space 14 between these seats furnishing room for passengers to get in and out.

The object in omitting the back from the end portions 6 of the seat 5 is to permit the passengers who ride on such end portions to face either to the front or to the rear, as desired, and also to provide an automobile which presents a minimum area for the wind to strike when the vehicle is being occupied by a single person.

With the arrangement of seats thus described I have provided room for seven passengers in the same place usually occupied by seats for four passengers.

In order to increase the carrying capacity of luggage, tools, &c., I employ boxes or compartments 16 under the longitudinal seats 12 and also other compartments 17 under the projecting portion 6 of the transverse seat. In my preferred construction I hinge the seat-boards of the seats, so that they may be raised in order to gain access to the various compartments. The entire seat-board of the seat 5 is hinged at its ends, as at 19, so that by raising the same into the position shown in Fig. 6 access may be had to the two compartments 17. The seat-boards of the side seats 12 are also hinged, as shown in Fig. 5, so that by raising either one of them access to the corresponding compartments 16 may be had. From Fig. 5 it will be noted that the seat-board of the seat 12 projects beyond the hinge 21, as at 20, so that when the seat-board is raised to the dotted-line position the said projecting end engages the outside of the compartment 16 and serves as a stop to limit the opening movement of the said seat-board.

In some automobiles the steering mechanism 9 is placed at one side of the center, as shown in Fig. 4, and in such event I will place the steering-seat 8 at one side and in the proper position for the occupant to manipulate the steering device 9. I may also, if desired, provide a companion seat 8', which faces the front, this construction still leaving the projecting end portions 6' for seats which face either front or back, as desired. In other respects the modification shown in Fig. 4 is the same as that shown in the other views.

While I have herein illustrated compartments under the projecting portions of all of the seats, yet my invention would not be departed from if compartments were employed under part of the projecting portions only. As a general thing, however, it is desirable to have as much space for stowing away and carrying luggage as possible. In gasolene-automobiles as now commonly constructed the batteries and the coil for the sparking mechanism are usually placed in close proximity to the engine, with the result that the heat and oil from the engine frequently damages them to such an extent as to render them unfit for use. To obviate these disadvantages, it is my intention to employ the boxes or compartments 17 for receiving the batteries and coil, respectively, although the invention would not be departed from if these compartments were used for any other purpose.

I wish to call attention to the fact that all of the compartments are located on the exterior of the body 3, so that the addition of the compartments does not increase in any way the size of the body itself.

Another point that I desire to emphasize is that my invention may be applied to any automobile without increasing in any way the space actually occupied by it. The width of an automobile is determined by the width of the running-gear, and from Figs. 2 and 3 it will be seen that my improved body is, in fact, slightly narrower than the running-gear.

It will be obvious to those skilled in the art that various changes may be made in the details of the construction without changing in any way the principle of the invention.

Having described my invention, what I claim as new, and desire to secure by Letters Patent, is—

1. In an automobile, a body carrying the driving mechanism, a seat extending transversely of the body and projecting beyond the latter at its ends and across the plane of the wheels, and compartments located beneath the projecting ends of the seat.

2. In an automobile, a body carrying the driving mechanism, a seat extending transversely of the body and projecting beyond the latter at its ends and across the plane of the wheels, and compartments located beneath the projecting ends of the seat, said compartments being situated outside of the body.

3. In an automobile, a body, a seat extending transversely of the body and having its ends projecting beyond the latter and across the plane of the wheels, and compartments beneath the projecting ends of the seat, said seat being hinged to the body, whereby when it is turned back both said compartments are opened.

4. In an automobile, a body, a seat extending transversely across the body and having its ends projecting beyond the latter, said seat having its central portion formed to face the front and the end portions formed to face either front or rear.

5. In an automobile, a body, a seat extending transversely of said body, and having its end portions projecting beyond the latter, and a steering device, that portion of said seat which is opposite the steering device having a back and constituting a seat for the person operating the vehicle and the end portions of said seat having no back whereby the occupants of said end portions may face either direction.

6. In an automobile, a body, a seat extending transversely of said body, two separate rear seats extending longitudinally of the body and arranged face to face, said seats extending over the rear wheels, and a luggage-carrying compartment under one of said seats outside of the vehicle-body and extending over the adjacent rear wheel.

7. In an automobile, a body, a seat extending transversely of the body, two rear seats extending longitudinally of the body and arranged face to face, said rear seats extending over the plane of the wheels and the seat-board of one of said seats being hinged, and a luggage-carrier compartment beneath said latter seat outside of the vehicle-body and extending over the plane of the adjacent rear wheel.

8. In an automobile, a body, and a seat extending transversely of the body, two rear seats extending longitudinally of the body and arranged face to face, said seats extending across the plane of the rear wheels, and compartments beneath each of said longitudinal seats, said compartments being situated on the exterior of the vehicle-body and also extending across the plane of the rear wheels.

9. In an automobile, a body, a seat extending transversely of the body and projecting at its ends beyond the sides of the body, compartments beneath the projecting ends of said seat, two rear seats extending longitudinally of the body and also projecting beyond the sides of the body, and compartments beneath the projecting portions of said longitudinal seats.

10. In an automobile, a body, a seat extending transversely of the body and projecting at its ends beyond the sides of the body, compartments beneath the projecting ends of said seat, two rear seats extending longitudinally of the body and also projecting beyond the sides of the body, and compartments beneath the projecting portions of said longitudinal seats, the seat-boards of all of said seats being hinged so as to give access to the various compartments.

11. In an automobile, a body-carrying driving mechanism, a seat extending transversely of the body and projecting beyond the sides of the latter, said seat having its central portion formed to face the front and its end portions formed to face either front or rear, combined with two longitudinally-extending seats at the rear of the transverse seat, said longitudinal seats also projecting beyond the sides of the body.

In testimony whereof I have signed my name to this specification in the presence of two subscribing witnesses.

GEORGE OTIS DRAPER.

Witnesses:
E. D. BANCROFT,
ERNEST W. WOOD.

---

Correction in Letters Patent No. 730,353.

It is hereby certified that in Letters Patent No. 730,353, granted June 9, 1903, upon the application of George Otis Draper, of Hopedale, Massachusetts, for an improvement in "Automobiles," an error appears in the printed specification requiring correction, as follows: In line 34, page 3, the word "luggage-carrier" should read *luggage-carrying;* and that the said Letters Patent should be read with this correction therein that the same may conform to the record of the case in the Patent Office.

Signed and sealed this 23d day of June, A. D., 1903.

[SEAL.]

F. I. ALLEN,
*Commissioner of Patents.* seat being hinged to the body, whereby when it is turned back both said compartments are opened.

4. In an automobile, a body, a seat extending transversely across the body and having its ends projecting beyond the latter, said seat having its central portion formed to face the front and the end portions formed to face either front or rear.

5. In an automobile, a body, a seat extending transversely of said body, and having its end portions projecting beyond the latter, and a steering device, that portion of said seat which is opposite the steering device having a back and constituting a seat for the person operating the vehicle and the end portions of said seat having no back whereby the occupants of said end portions may face either direction.

6. In an automobile, a body, a seat extending transversely of said body, two separate rear seats extending longitudinally of the body and arranged face to face, said seats extending over the rear wheels, and a luggage-carrying compartment under one of said seats outside of the vehicle-body and extending over the adjacent rear wheel.

7. In an automobile, a body, a seat extending transversely of the body, two rear seats extending longitudinally of the body and arranged face to face, said rear seats extending over the plane of the wheels and the seat-board of one of said seats being hinged, and a luggage-carrier compartment beneath said latter seat outside of the vehicle-body and extending over the plane of the adjacent rear wheel.

8. In an automobile, a body, and a seat extending transversely of the body, two rear seats extending longitudinally of the body and arranged face to face, said seats extending across the plane of the rear wheels, and compartments beneath each of said longitudinal seats, said compartments being situated on the exterior of the vehicle-body and also extending across the plane of the rear wheels.

9. In an automobile, a body, a seat extending transversely of the body and projecting at its ends beyond the sides of the body, compartments beneath the projecting ends of said seat, two rear seats extending longitudinally of the body and also projecting beyond the sides of the body, and compartments beneath the projecting portions of said longitudinal seats.

10. In an automobile, a body, a seat extending transversely of the body and projecting at its ends beyond the sides of the body, compartments beneath the projecting ends of said seat, two rear seats extending longitudinally of the body and also projecting beyond the sides of the body, and compartments beneath the projecting portions of said longitudinal seats, the seat-boards of all of said seats being hinged so as to give access to the various compartments.

11. In an automobile, a body-carrying driving mechanism, a seat extending transversely of the body and projecting beyond the sides of the latter, said seat having its central portion formed to face the front and its end portions formed to face either front or rear, combined with two longitudinally-extending seats at the rear of the transverse seat, said longitudinal seats also projecting beyond the sides of the body.

In testimony whereof I have signed my name to this specification in the presence of two subscribing witnesses.

GEORGE OTIS DRAPER.

Witnesses:
E. D. BANCROFT,
ERNEST W. WOOD.

---

Correction in Letters Patent No. 730,353.

It is hereby certified that in Letters Patent No. 730,353, granted June 9, 1903, upon the application of George Otis Draper, of Hopedale, Massachusetts, for an improvement in "Automobiles," an error appears in the printed specification requiring correction, as follows: In line 34, page 3, the word "luggage-carrier" should read *luggage-carrying;* and that the said Letters Patent should be read with this correction therein that the same may conform to the record of the case in the Patent Office.

Signed and sealed this 23d day of June, A. D., 1903.

[SEAL.]

F. I. ALLEN,
*Commissioner of Patents.*

It is hereby certified that in Letters Patent No. 730,353, granted June 9, 1903, upon the application of George Otis Draper, of Hopedale, Massachusetts, for an improvement in "Automobiles," an error appears in the printed specification requiring correction, as follows: In line 34, page 3, the word "luggage-carrier" should read *luggage-carrying;* and that the said Letters Patent should be read with this correction therein that the same may conform to the record of the case in the Patent Office.

Signed and sealed this 23d day of June, A. D., 1903.

[SEAL.]

F. I. ALLEN,
*Commissioner of Patents.*